Figure 1:
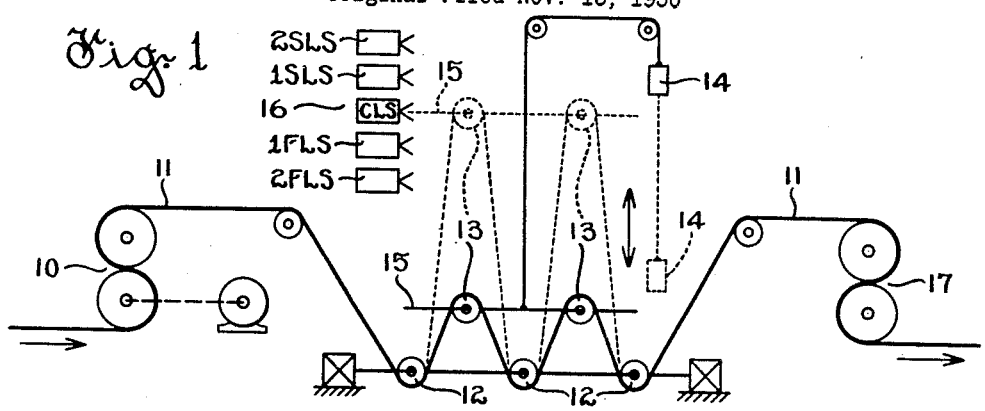

April 26, 1955

J. M. NEWMAN ET AL 2,707,254

LOOPING TOWER MOTOR CONTROL SYSTEM

Original Filed Nov. 13, 1950

Inventors
John M. Newman
Sanford M. Strand,
By W. E. Lyon
Attorney

United States Patent Office 2,707,254
Patented Apr. 26, 1955

2,707,254

LOOPING TOWER MOTOR CONTROL SYSTEM

John M. Newman, Wauwatosa, and Sanford Maynard Strand, Sr., Elm Grove, Wis., assignors to Cutler-Hammer, Inc., Milwaukee, Wis., a corporation of Delaware Continuation of application Serial No. 195,292, November 13, 1950. This application May 7, 1954, Serial No. 428,262

10 Claims. (Cl. 318—6)

This invention relates to a system of speed regulation of electric motor drives utilized in looping towers of continuous processing lines for treating strip material, and more particularly to automatic control systems for such looping towers.

As will be understood, continuous processing lines for strip material, as, for example, strip steel, fabric, paper, or the like, normally comprise an entry section, a processing section which runs continuously at substantially constant speed, and a delivery section, each of the aforementioned sections being controllable as a unit independently of the other sections. In order to have the middle or processing section run continuously, it must be possible to stop and start the entry and delivery sections independently in order to change coils or rolls of the strip material being processed. Moreover, if the processing section is to run continuously the entry and delivery sections preferably include a device known as a looping tower whose function it is to store material treated by the processing section to insure continuity of operation of the processing section while the entry or delivery sections are stopped to change coils or rolls. Such looping towers, if maximum use is to be made of their storage capacity, must be capable of being regulated to maintain the extension thereof as near to maximum capacity as possible, such position of the tower for purposes of this application being denominated the optimum position. The optimum position or extension should obviously be as close to maximum filling of the tower as is possible. Optimum position in the case of a delivery section looping tower is, of course, as near to the bottom of the tower as possible.

It is an object of this invention to provide automatic operation and regulation of such looping towers, and more particularly to provide a system of control therefor which permits both high speed filling (or emptying) of the looping tower, and at the same time permits filling of the tower to optimum position as heretofore defined to make full usage of the storage capacity of the tower.

Another object is to provide a system of control affording high speed filling (or emptying) of the tower and automatically maintaining the optimum condition of the tower at all other times.

Another object is to afford the aforementioned control characteristics by utilizing purely mechanical means, simple and rugged of construction, easy to maintain, and relatively inexpensive to manufacture and assemble, thereby to eliminate devices operative in response to electrical signals and/or electronic means.

Another object is to provide control means of the aforementioned character comprising a minimal number of constituent elements while at the same time affording improved automatic operation and regulation.

Another object is to provide motor speed regulating means including switches incorporated in a control system affording alternative functioning of certain of the switches under certain conditions only.

Various other objects and advantages will hereinafter appear or become apparent.

The accompanying drawings illustrate an embodiment of the invention which will now be described, it being understood that various modifications may be made in the embodiment illustrated without departing from the scope of the appended claims.

Figure 2:
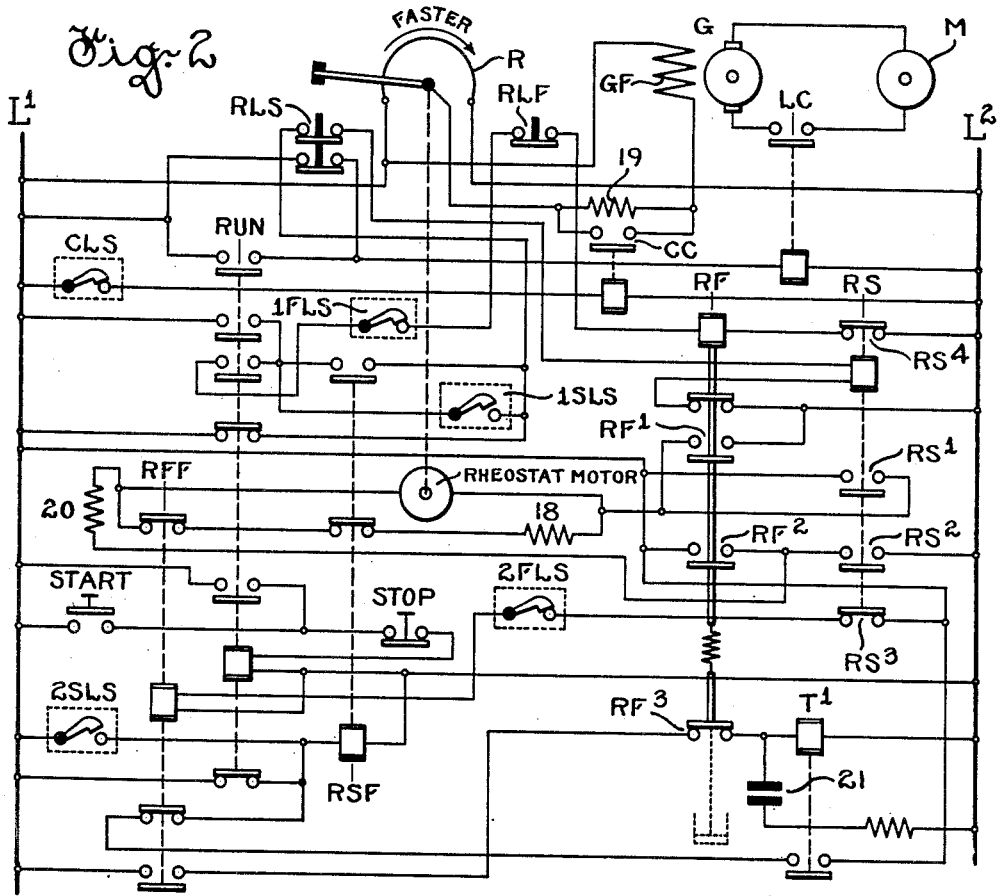

In the drawings,

Figure 1 is a diagrammatic illustration of a portion of a typical continuous processing line, only the looping tower of the entry section being illustrated; and Fig. 2 is a diagrammatic illustration of the system of electrical control for the looping tower illustrated in Fig. 1.

Referring first to Fig. 1, the reference numeral 10 designates a tension bridle at the entry section for feeding strip material 11 to the looping tower, the direction of movement of the strip material being indicated by the arrows. The tension bridle 10 is operated by a motor M.

As will be understood, the looping tower proper comprises a lower set of fixed rollers 12 and a set of upper rollers 13, the latter being jointly movable in a vertical plane as indicated. The rollers 13 are biased to their uppermost position by a counterweight device diagrammatically illustrated at 14 to normally maintain the tower at a position of maximum extension. As will be apparent, the strip material 11 is fed through the tension bridle 10 and then threaded through the looping tower to form loops of length dependent on the vertical position of the upper rollers 13, and ultimately fed through the line tension bridle 17 which runs at constant speed.

Extending laterally from the rollers 13 is an arm 15 adapted to operate a set of switches, designated generally by the numeral 16, with upward or downward movement of the rollers 13, each of the switches 16 preferably having a forked actuator as shown to insure operation thereof with travel of arm 15 in either direction. As shown, the switches 16 are located at the upper end of the entry section looping tower, it being understood that in the looping tower between the processing section (not shown) and the delivery section (not shown) the switches would be located near the lower end of the tower, and their functions (to be hereinafter described) would be inverted to control emptying of the looping tower in contrast to the control over filling of the entry section looping tower illustrated.

As shown the motor M driving the tension bridle 10 derives its electrical energy from a generator G driven by a prime mover (not shown). The armatures of the motor M and generator G are connected in a closed loop which is preferably established by a loop contactor LC. As will be apparent, the speed of motor M may be regulated by variation of the field strength of the generator field GF in the embodiment illustrated, it being understood that while the aforementioned adjustable voltage arrangement is preferred, the motor M might be a suitable adjustable speed motor and the generator G eliminated. In that event, it will be obvious, suitable means to accelerate the motor to base speed would be necessary.

Referring to Fig. 2, it will be seen that the strength of the generator shunt field is varied to achieve the aforementioned speed regulation of motor M by a motor driven rheostat R connected in potentiometer relation with the generator field across the source of electrical supply L¹, L². The rheostat motor is adapted to be run in reverse directions selectively in response to operation of relays RF and RS, as will hereinafter be described, and at two speeds in each direction dependent upon whether or not a shunt resistor 18 is connected across the rheostat motor terminals.

The direction of rotation of the rheostat motor and its speed, as aforementioned, are in turn controlled by a set of switches 16, preferably ordinary limit switches, through relays RS, RF, RSF and RFF. Under normal regulating conditions, i. e., when the tower has been filled to optimum position (near maximum capacity) and being maintained there by virtue of the fact that motor M is regulated to a speed substantially equal to the speed of the processing section, the switches 16 are adapted to control the rheostat motor as follows: the lowermost switch 2FLS affords operation of the rheostat in the "increase speed" direction at a fast rate to secure rapid acceleration of motor M, the next switch 1FLS affords operation of the rheostat in the "increase speed" direction at a slow rate to secure slow acceleration of motor M, the middle switch CLS controls a contactor CC which commutates a shunt resistor 19 in series with the generator field to afford minor regulation of the speed of motor M without disturbing the position of the motor driven rheostat R, the next switch 1SLS affords operation of the rheostat in the "decrease speed" direction at a slow rate to afford slow deceleration of the motor M, while the uppermost switch 2SLS affords operation of the rheostat in "decrease speed" direction at a fast rate of speed to afford rapid deceleration of the motor M. As will be apparent, operation of the switches 16 will afford regulation of the speed of motor M to substantially the speed of the processing section (i. e., the speed of line tension bridle 17) and will maintain the looping tower extended approximately to the height at which the switch CLS is placed with reference to the bottom of the tower. However, were the switches 16 to afford operation of the rheostat R only as afore-described, it will be obvious that the switches 16 woud have to be placed far apart and a substantial distance from the top of the tower, lest upon filling an empty tower at high speed the rollers 13 overshoot the switch CLS and hit the top of the tower. (A limit switch, not shown, is ordinarily positioned at the top of the tower to completely stop the section if such an event occurs.) Since the speed differential between the entry (or delivery) section and the processing section may be from 50% to 200% to accomplish tower filling in the least possible time it is not possible to utilize the switches 16 in their normal function as aforedescribed for this initial speed matching operation without sacrificing storage capacity of the tower, since the decelerating switches would have to be placed far enough away from maximum extension of the tower to effect the necessary slow-down before the rollers 13 hit the top of the tower. This would, of course, establish the regulating position of switch CLS considerably below maximum extension of the tower and result in considerable waste of space and loss of storage capacity in the tower.

To eliminate this undesirable condition, an addition of timing means, preferably a timing relay $T^1$ having an instantaneous closing, timed opening contact is utilized to afford alternate function of the switch 2FLS to cause operation of rheostat R in the "decrease speed" direction at a fast rate of speed under tower filling conditions and to render switch 1FLS ineffective under the same conditions. "Tower filling" conditions may be defined as any condition in which the arm 15 of the looping tower mechanism has fallen outside, i. e. below, the range of the switches 16, as for example, when the section is stopped for change of coils or rolls, or during running, when some abnormal situation results in such condition and the motor M is running at a higher speed that that of the line section in an effort to reestablish the looping mechanism at optimum position. In the case of a delivery section, "tower emptying" conditions are accomplished in the same manner as previously mentioned.

The effect of the relay $T^1$ can best be illustrated by description of the sequence of operation of the control when the tower is to be filled upon change of coils, the processing section having meanwhile been running at constant speed. The rollers 13 will be near the bottom of the tower as shown in full line in Fig. 1, and the motor M will be stopped because relay LC is unenergized; switches 2FLS, 1FLS and CLS will be closed and swtiches 1SLS and 2SLS will be open in this position of the tower. Assuming $L^1$ and $L^2$ to be energized from a source of direct current, the start button is depressed, closing the circuit to the Run relay which picks up, thereby energizing the loop contactor LC to close the motor-generator circuit. Since in this position of the rollers 13, the switches 1FLS and 2FLS are closed, relay RF will be energized through the normally closed contacts of the rheostat limit switch RLF and the normally closed contacts RS4 of relay RS, and the rheostat motor connected in series with resistor 20 across the line through the now closed contacts $RF^1$ and $RF^2$ of relay RF. Since relay RFF is energized through closed switch 2FLS and contacts $RS^3$ of relay RS, the rheostat motor operates the rheostat R in the "increase speed" direction at a fast rate to rapidly accelerate the entry tension bridle motor M up to full speed through full voltage on the generator field. This entire sequence is the result of the aforementioned closure of the start switch.

The closure of timing relay $T^1$ sets up the circuit to the RSF relay so that subsequent deenergization of the RFF relay by opening of switch 2FLS upon tripping thereof by the arm 15 traveling in the upward direction with filling of the tower, immediately energizes the RSF relay, opening the circuit of the shunt resistor 18, and also energizes the RS relay through the Run relay and the now closed contacts $RSF^1$ on the RSF relay for closure of contacts $RS^1$ and $RS^2$ to connect the rheostat motor across the line in the reverse direction to return the rheostat in the "decrease speed" direction at a fast rate. The purpose of the timing relay $T^1$, therefore, is to set up switch 2FLS to afford fast deceleration of motor M but only under those conditions when the looping mechanism is sufficiently outside the range of switches 16 (i. e., 2FLS is closed) and the rheostat is at full speed position with the rheostat limit switch RLF open for a time interval to enable contact $RF^3$ to close although as will be obvious to those skilled in the art, such operation could be arranged to occur at any position of the rheostat requiring speed regulation of the motor M at a speed greater than that of the processing section. Upward movement of the arm 15 will open 2FLS and under the foregoing condition cause deceleration of motor M.

Further upward movement of arm 15 will trip switch 1FLS to open, but energization of relay RS renders such tripping ineffective to energize relay RF since the latter is behind the now open interlock contacts $RS^4$ on relay RS.

The aforementioned deenergization of relay RFF also opens the circuit to the coil of timing relay $T^1$, but the latter remains energized for a time dependent upon the discharge time of its capacitor 21. For best results with a given line speed of the processing section, this time may be set so that $T^1$ drops out at a time when the arm 15 engages the switch CLS as shown by dotted lines in Fig. 1. Dropping out of relay $T^1$ deenergizes the relays RSF and RS and stops the rheostat motor, leaving the rheostat arm at a setting affording speed of motor M substantially equal to line speed. Thus the time setting of the timer $T^1$ is preferably set so that the looping tower comes to rest at a position where arm 15 enagges the switch CLS, that is, at optimum position.

The looping tower thereafter is maintained at this position of near maximum extension (optimum position) by operation of switches 16 in their normal functioning, minor speed regulation being taken care of by opening and closure of switch CLS to operate a commutating contactor CC for inserting or removing the resistor 19 in the generator field circuit thereby rendering unnecessary the movement of the motor operated rheostat R for minor corrections in speed. To stop the section, it is merely necessary to depress the stop button to deenergize the Run relay and thereby energize the RSF and RS relays to bring the rheostat back to minimum voltage position at a fast rate of speed. At this position the rheostat arm strikes the rheostat limit switch RLS to open the circuit to the loop contactor LC for disconnecting the motor M.

As aforementioned, the function of switch 2FLS will be reversed during replenishing of the strip material in the tower from a position of the looping mechanism sufficiently outside (below) the range of the limit switches 16. However, during the usual operation of switches 16 but where there is unusual time lag in the response of the machinery to changes in setting of the rheostat R, it is desirable to preserve the normal functioning of switch 2FLS when under running conditions the looping mechanism for some reason falls slightly below the range of the switches 16. To prevent reversal of function of 2FLS under those conditions, the energization of timing relay $T^1$ is delayed by imposing a time delay upon the closure of contact $RF^3$ of relay RF. This may be accomplished simply by the dashpot means shown in dotted lines in Fig. 2, or by an additional capacitor timed relay such as $T^1$ or the like. Such time delay in closure of contacts $RF^3$ and hence energization of $T^1$ is set to cancel time lag in the machinery as aforementioned so that 2FLS is opened with upward movement of the looping mechanism before $T^1$ is energized, thereby preventing reversal of function of 2FLS under those conditions. Such time delay is, of course, adjustable to govern the position of the looping tower outside the range of the switches 16 from which reversal of function of 2FLS is desired.

As will be apparent, the utilization of the timing relay $T^1$ in tower filling operations to render switch 1FLS ineffective and to afford functioning of switch 2FLS to cause fast deceleration of motor M in contrast to their normal regulating function of affording acceleration of motor M during ordinary operation of maintaining the tower at near maximum extension during running periods, permits simultaneously high speed filling of the looping tower and full utilization of its maximum storage capacity.

It will be obvious to those skilled in the art that the timing feature of relay $T^1$, which in the embodiment illustrated is accomplished by discharge of the capacitor 21, may be accomplished by other suitable timing means, as will readily suggest themselves. Moreover, other modifications in the embodiment illustrated may be made without departing from the scope of the appended claims.

While the embodiment of the invention has been described in terms of an entry section looping tower, the invention is to be understood as equally applicable to delivery section looping towers, and the appended claims are to be so construed. More particularly the terms "fill" or "filling" and the like as used in the claims are to be understood to include the "empty" or "emptying" functions of a delivery section looping tower.

We claim:

1. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising a deviation responsive device which for a limited range of deviation effects only one of such two adjustments of said regulating means, and means coordinated with the two aforementioned means, which third means upon a wider deviation of loop height to be rectified by the device aforementioned renders said device effective first to act normally on said regulating means and then to act reversely on said regulating means for minimizing over-regulation.

2. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising a deviation responsive device which for a limited range of deviation effects only one of such two adjustments of said regulating means, and means coordinated with the two aforementioned means, which third means insures that said one adjustment of said regulating means is effective whenever said loop height goes beyond one extreme limit of said range of deviation, and which third means causes said device to effect the other of said two adjustments of said regulating means when said loop height initially comes within said limit of said range of deviation following starting of said drive.

3. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising a limit switch which for a limited range of deviation effects only one of such two adjustments of said regulating means, and means coordinated with the two aforementioned means, which third means upon a wider deviation of loop height to be rectified by said limit switches renders said switch effective first to act normally on said regulating means and then to act reversely on said regulating means for minimizing over-regulation.

4. In a continuous process line having electric motor drive and a looping tower, in combination with motor speed regulating means adjustable for motor acceleration and deceleration, loop controlled means controlling said regulating means for accelerating and decelerating adjustments of the latter as a function of deviation from a reference loop condition, said loop controlled means comprising a limit switch which for a limited range of deviation effects only one of such two adjustments of said regulating means, and means coordinated with the two aforementioned means, which third means insures that said one adjustment of said regulating means is effective whenever the loop height goes beyond one extreme limit of said range of deviation, and which third means causes said limit switch to effect the other of said two adjustments of said regulating means when said loop height initially comes within said limit of said range of deviation following starting of the drive, said third means including timing means limiting the duration of said other of said two adjustments of said regulating means.

5. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising limit switches one of which is operable for a limited range of deviation to effect accelerating adjustment of said regulating means, and means coordinated with the two aforementioned means, which third means upon wider deviation of loop height to be rectified by said one of said limit switches renders the same effective first to act normally on said regulating means and then to act reversely on said regulating means for minimizing over-regulation, said third means including timing means limiting the duration of such reverse action of said one limit switch.

6. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising limit switches operable for certain limited ranges of deviation, certain of said switches affording acceleration adjustments of said regulating means and the other of said switches affording deceleration adjustments of said regulating means, and means coordinated with the two aforementioned means, which third means insures that accelerating adjustment of said regulating means is effective whenever said loop height goes beyond one extreme limit of one of said ranges of deviation, and which third means causes one of said limit switches to effect decelerating adjustment of said regulating means when said loop height initially comes within said limit of said one of said ranges of deviation following starting of the drive.

7. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising a plurality of limit switches located below said reference loop condition at various ranges of deviation to effect acceleration adjustments of said regulating means, and means to minimize over-regulation coordinated with said regulating means and said loop controlled means upon deviation of the loop beyond said ranges to be rectified by one of said switches to render said switch effective to first act normally on said regulating means and then to act reversely on said regulating means, said means also rendering the other of said limit switches ineffective to adjust said regulating means.

8. In a continuous process line having electric motor drive and a looping tower, in combination, motor speed regulating means adjustable for motor acceleration and deceleration, loop controlled means controlling said regulating means for accelerating and decelerating adjustments of the latter as a functiton of deviation from a reference loop condition, said loop controlled means comprising a plurality of limit switches located below said reference loop condition at various ranges of deviation to effect acceleration adjustments of said regulating means, and means coordinated with said regulating means and said loop controlled means, which third means insures that said accelerating adjustment of said regulating means is effective whenever said loop height goes below the lowermost of said limit switches, and which third means causes the last mentioned limit switch to effect decelerating adjustment of said regulating means when said loop height initially goes above the last mentioned limit switch following starting of the drive, said third means also rendering the other of said limit switches ineffective under the last mentioned condition of loop height and said third means including timing means limiting the duration of said decelerating adjustment of said regulating means and the ineffectiveness of the other of said limit switches.

9. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprisng a plurality of limit switches certain of which switches being located below said reference loop condition to be operable for various ranges of deviation below said reference loop condition to effect acceleration adjustments of said regulating means, the other of said switches being located above said reference loop condition to be operable for various ranges of deviation above said reference loop condition to effect deceleration adjustments of said regulating means, and means coordinated with said regulating means and said loop controlled means upon deviation of the loop height below the lower ranges to be rectified by one of said accelerating limit switches to render said last mentioned switch effective first to act normally on said regulating means to effect acceleration adjustment and then to act reversely to effect deceleration adjustment of said regulating means for minimizing over-regulation.

10. In a continuous process line having electric motor drive and a looping tower, in combination, motor speed regulating means adjustable for motor acceleration and deceleration, loop controlled means controlling said regulating means for accelerating and decelerating adjustments of the latter as a function of deviation from a reference loop condition, said loop controlled means comprising a plurality of limit switches certain of which switches being located below said reference loop condition to be operable for various ranges of deviation below said reference loop condition to effect acceleration adjustments of said regulating means, the other of said switches being located above said reference loop condition to be operable for various ranges of deviation above said reference loop condition to effect deceleration adjustments of said regulating means, and means coordinated with said regulating means and said loop controlled means upon deviation of the loop height below the lower ranges to be rectified by one of said accelerating limit switches to render said last mentioned switch effective first to act normally on said regulating means to effect acceleration adjustment and then to act reversely to effect deceleration adjustment of said regulating means for minimizing over-regulation, said means coordinated with said regulating means and said loop controlled means including timing means limiting the duration of such reverse action of said one of said accelerating limit switches.

References Cited in the file of this patent

UNITED STATES PATENTS

| | | |
|---|---|---|
| 1,709,616 | Goodwin | Apr. 16, 1929 |
| 2,285,654 | Hanna et al. | June 9, 1942 |
| 2,353,639 | Berthold et al. | July 18, 1944 |
| 2,487,755 | Few | Nov. 8, 1949 |